Patented Oct. 21, 1947

2,429,445

UNITED STATES PATENT OFFICE 2,429,445

PROCESS FOR REACTION PRODUCTS OF PRIMARY AND SECONDARY ALKYLOL-AMINES

Harland H. Young, Chicago, Ill., and David Rubinstein, Brookline, Mass., assignors to Industrial Patent Corporation, Chicago, Ill., a corporation of Delaware No Drawing. Application September 29, 1943, Serial No. 504,297

14 Claims. (Cl. 260—404)

The present invention relates to an improved reaction product and process of preparing the same from the condensation of an alkylolamine and an acylating substance.

Heretofore, various methods have been proposed for the manufacture of condensation products from alkylolamines and acylating substances, such as carboxylic acids. The utility of such products as emulsifying and dispersing agents, precipitants, and wetting agents has been pointed out in the Kritchevsky Reissue Patent No. 21,530 of August 13, 1940, which proposes the condensation of equimolecular or excess quantities of alkylolamines with higher fatty acids or derivatives thereof with the splitting out of either water or an acid according to whether the fatty acid or acyl halide derivative thereof are employed. It has also been observed that a soap is formed by the combination of the alkylolamine and fatty acid and that this product condenses under the influence of heat to produce a reaction product consisting of a mixture of individual compounds containing predominating percentages of multiacylated derivatives of the particular alkylolamine employed, wherein more than a single replaceable hydrogen of the alkylolamine is substituted by a fatty acid carboxyl group. For example, in the case of alkylolamines having at least one amine hydrogen atom, the reaction product comprises the alkylolamide, the alkylolamine soap, alkylolamine monoacid ester, alkylolamine diacid ester, alkylolamide monoacid ester and alkylolamide diacid ester. Where the acylating substance is derived from substituted acyl derivatives such as triglyceride fats, a substitution reaction takes place and the alkylolamine soap is not formed. Since the tertiary alkylolamines do not contain a replaceable amine hydrogen atom, the aforementioned reaction is limited to the combination of acylating materials whatever the source with primary and secondary alkylolamines. Ordinarily, the reaction mixture predominates in multiacylated derivatives, namely the alkylolamine diacid ester, alkylolamide monoacid ester, and alkylolamide diacid ester, which exist in a state of equilibrium in the reaction mixture. The elevated temperatures, which are ordinarily necessary to accomplish the condensation reaction within a reasonable time period are conducive to the formation of the multiacylated derivatives in the reaction mixture. When lower temperatures are employed, the proportion of multiacylated derivatives formed is somewhat reduced but extraordinary time periods are required to complete the condensation reaction. Furthermore, in the latter case, the formation of substantial quantities of multiacylated derivatives inevitably occurs.

It has been discovered that monoacylated derivatives of alkylolamines, i. e., the alkylolamide and alkylolamine monoacid ester, have much greater activity for certain purposes than the multiacylated derivatives, and reaction mixtures containing substantial quantities of the monoacylated materials exhibit properties which are unexpected in products resulting from the acylation of alkylolamines by known processes. The present invention contemplates the manufacture of improved reaction products of alkylolamines and acylating materials in a two-stage process under reacting conditions controlled to produce a product containing effective quantities of monoacylated derivatives of the alkylolamine, said product containing a single acylatable hydrogen of the alkylolamine replaced by an acyl group. The process comprises reacting an alkylolamine and an acylating substance at a sufficient temperature and for a sufficient time to cause substantial acylation of said alkylolamine and then treating the resultant mixture of compounds in the presence of excess alkylolamine at a lower temperature for a sufficient time to shift the reaction mixture equilibrium and convert the multiacylated derivatives to the more active compounds.

A primary object of the invention is to provide an improved reaction product from the condensation or reaction of an alkylolamine and an acylating substance. Another object is to provide an improved process for reacting an alkylolamine with an acylating substance to form products of enhanced activity. An additional object is to provide a reaction product of an alkylolamine and acylating substance predominating in monosubstituted alkylolamine derivatives. Another object is to provide a two-stage process for reacting an alkylolamine and an acylating substance wherein the initially formed product is treated at a lower temperature to shift the equilibrium in the reaction mixture.

More particularly, in accordance with the present invention, improved reaction products are formed by the condensation of primary and secondary alkylolamines with higher fatty acids in a two-stage process under reacting conditions controlled to produce a product predominating in monosubstituted acid derivatives of the alkylolamines. The process comprises the reaction of alkylolamine and acylating material at a temperature sufficiently high to cause substantial acylation of the alkylolamine, followed by treatment of the reaction mixture in the presence of an excess of alkylolamine at a lower temperature for a sufficient time to shift the equilibrium to form the desired compounds. The time of the initial reaction may be governed by the specific reactants selected, the temperature employed, and is preferably carried out in the presence of an excess of alkylolamine. As a general rule where an acid is used, it is preferred to carry out the initial phase of the reaction at a sufficiently elevated temperature to reduce the alkylolamine-fatty acid soap to about 10 per cent or less by weight of the reaction mixture. Alternatively, the reaction may be carried out until about 1 mol of water is removed from the reaction mixture for each mol of acid employed, or, in the case that a triglyceride fat provides the acylating function, until the fat has substantially reacted with the alkylolamine, followed by reaction at a lower temperature to shift the equilibrium of the resulting mixture of compounds to the formation of predominating quantities of monosubstituted derivatives. The latter compounds are themselves in equilibrium in the reaction mixture.

The initial heating stage for performing the acylation or soap decomposition may be carried out at temperatures of from 120° C. to 250° C. for a period of from 15 minutes to 16 hours. Reaction at the higher temperature is sufficient in the smaller time period. Since the formation of the alkylolamide or alkylolamine acid ester requires the splitting out of water where a carboxylic acid is employed, it is preferred to carry on the reaction under vacuum conditions to provide for evaporation of the water at relatively low temperatures. Although the reaction under vacuum can be run at temperatures ranging from 120° C. to 250° C., the boiling point or vapor pressure of the amine is a limiting factor. The rate at which water is removed is controlled by its vapor pressure and the rate at which it is liberated, both being a function of the temperature. The initial stage of the reaction has proceeded to the proper point when a quantity of water is liberated substantially equivalent to the molal quantity of carboxylic acid employed or until the acid content of the fat or other material is substantially consumed. In order to prevent complicated secondary reactions, as well as the loss of the alkylolamine, it is preferable to employ temperatures not above 170° C. Above 250° C., secondary dehydration and decomposition takes place to form not only alkylolamide esters, but even morpholine compounds, which compounds are not active for the purpose of the present invention. Furthermore, the equilibrium shifts with the temperature and the equilibrium at 260° C. is not conducive to producing the desired compounds. Very low temperatures are not practical because of the period of time, which may extend to days, required to carry the reaction to the desired extent. Thus, temperatures much below 100° C. result in very slow reactions which may require days to bring to the desired point. We have found that temperatures of 140° C. to 160° C. enable the reaction to be completed to the desired extent in a relatively short period of time and also to inhibit the formation of undesired compounds. At these temperatures, 2 to 4 hours is usually sufficient to accomplish the desired degree of reaction. When the reaction has been carried to the desired point, it is desirable to stop the vacuum and heating, otherwise some of the excess amine tends to volatilize. Any amine lost cannot, of course, assist in shifting the equilibrium in the proper direction to inhibit the formation of compounds having more than 1 reactive acylatable hydrogen substituted.

It is preferable that an excess of alkylolamine be maintained during the initial stage of the reaction to cause the desired shift in equilibrium. Successful results have been obtained with ratios of 1½ mols of the amine to 1 mol of carboxylic acid and also with ratios of 10 mols of amine to 1 mol of acid. In certain applications, for example, in the manufacture of shortening, as described more fully hereinafter, ratios of 1⅛ mols of the amine to 1 mol of carboxylic acid are preferred. The preferred lower limit of ratios of amine to acid, however, is approximately 1¾ mols of alkylolamine to 1 mol of carboxylic acid. Any molar excess of amine tends to shift the reaction in the desired direction but mol to mol ratios are unsatisfactory in the final reaction steps since amide esters result, comprising 40 per cent and up of the resulting product. At a molar ratio of approximately 1½ mols of amine to 1 of acid, the amount of amide ester is reduced to a small quantity.

For the manufacture of a product for use in soap, we prefer, following the initial heating stage and before the second stage, to adjust the alkylolamine-fatty acid soap content to form approximately 3 to 15 per cent by weight of the reaction product. This may be done, for example, by the addition of the required amount of higher fatty acid. Alternatively, the reaction temperature may be reduced somewhat prior to the point of soap elimination, so as to provide the desired soap concentration prior to the second stage. The presence of small percentages of soap is found to accelerate the aging process. In certain cases, it is preferred to employ a relatively small excess of alkylolamine and conduct the reaction in a manner to maintain the soap content at a minimum or react directly with a triglyceride fat. This procedure is adopted when, for special applications, a neutral product is desired.

The initial heating stage above described produces a composition which may contain some alkylolamide and alkylolamine mono-acid ester, but also contains substantial and ordinarily greater amounts of alkylolamide acid esters and possibly alkylolamine diester, particularly if a relatively low molal excess of alkylolamine to acylating substance is employed. The reaction product also contains unconverted alkylolamine-carboxylic acid soap where the acid is employed, depending on the degree of reaction carried out in the initial heating stage, together with free alkylolamine if an excess is employed in the reaction. If the first stage of the reaction is carried out in the presence of excess alkylolamine, the free alkylolamine is available in the reaction mixture to facilitate the second stage of the conversion. In the event an excess of alkylolamine is not employed in the first stage of the reaction, additional alkylolamine is added, since the presence of excess alkylolamine is essential to facilitate the conversion accomplished in the second stage of the process in accordance with this invention.

In the second stage, it is thought that a large proportion of the amide esters is converted into the amide by reaction with excess amine, and this product is then converted into the amine monoacid ester until an equilibrium between the two compounds is reached. The most desirable equilibrium exists in the range of temperatures from 40° C. to 90° C. At these temperatures, aging periods of from 4 to 100 hours may be employed. Use of temperatures above this range may be used but tend to promote secondary reactions. The time of aging, however, is a function of the temperature and is shorter the higher the temperature. The lower the temperature, however, the greater the degree of conversion of the amide to the amine monoacid ester and the greater the potency of the mixture. The time of aging likewise depends on temperature employed in the condensation reaction in the initial stage, since higher temperatures increase the formation of the di- and tri-substituted derivatives which require a longer aging period for conversion. A range of temperatures between 50° C. and 80° C. is preferred during the aging process since, at these temperatures, the reaction is relatively rapid and the amide esters are largely converted into the active compounds for the purpose of the invention. At the above temperatures, 24 to 48 hours may be required. However, 10 hours are usually sufficient to reach substantial equilibrium, resulting in a satisfactory product. A longer period of time, for example, 70 to 100 hours, in some cases produces a product having somewhat greater potency. The presence of amine soap tends to promote or catalyze the aging reaction and it is, therefore, advantageous to add an additional amount of carboxylic acid before the aging treatment, particularly in the reaction of alkylolamine with triglyceride fat where no soap is formed in the reaction. Thus, it has been found that the addition of enough free carboxylic acid at the beginning of the aging to form alkylolamine soap equal to approximately 3 to 15 per cent of the mixture causes the aging process to go forward at a more rapid rate. The latter procedure is generally preferred although, in some cases, the temperature may simply be lowered when the desired degree of reaction is reached.

In the manufacture of a product for use in shortening, a relatively slight excess of alkylolamine to fatty acid is employed in the initial stage of the reaction (e. g., about 1⅛ mols of alkylolamine to 1 mol of fatty acid, amounting to an approximate 12 per cent excess of alkylolamine) and the condensation conducted to substantially eliminate as nearly as possible the soap content of the mixture. In this case, it is preferred to employ a triglyceride fat as the acylating substance which does not form soap. The temperature is lowered and the aging accomplished at temperatures of from about 40° C. to 80° C. for a time period of from 10 to 100 hours.

The reactants of the present invention are primary and secondary alkylolamines and preferably carboxylic acids containing no less than 8 nor more than 18 carbon atoms within their molecule.

Examples of suitable primary and secondary alkylolamines are as follows:

Monoethanolamine $NH_2-CH_2-CH_2-OH$

Monopropanolamine $NH_2-CH_2-CH_2-CH_2-OH$

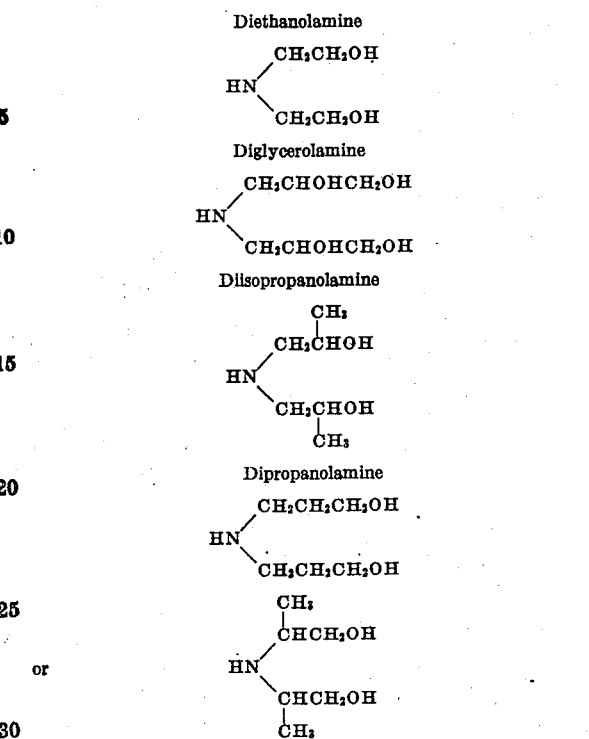

Examples of carboxylic acids which have been found particularly suitable for reaction with the alkylolamines are as follows:

| | |
|---|---|
| Lauric acid | $CH_3(CH_2)_{10}COOH$ |
| Capric | $CH_3(CH_2)_8COOH$ |
| Caprylic | $CH_3(CH_2)_6COOH$ |
| Myristic acid | $CH_3(CH_2)_{12}COOH$ |

The above lists of suitable primary and secondary alkylolamines and carboxylic acids are given merely by way of example and are not intended to be complete as other primary and secondary alkylolamines and carboxylic acids can be employed. Reaction products with carboxylic acids having from 8 to 14 carbon atoms within their molecule are ordinarily preferred for a soap improving agent although it is obvious that those having less than 8 and more than 14 carbon atoms may likewise be employed in accordance with this invention. For example, in the manufacture of an agent for the improvement of shortening, carboxylic acids having from 8 to 18 carbon atoms may be employed.

We have found that a number of reaction products are produced on heating, at high temperature, the soap which is formed initially by the reaction of carboxylic acids and dialkylolamine; for example, the following reactions result from a carboxylic acid having the general formula of

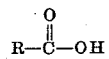

where R is preferably an alkyl group having from 7 to 17 carbon atoms to the molecule, and diethanolamine:

(a) The neutralization of the diethanolamine with carboxylic acid takes place upon mixing

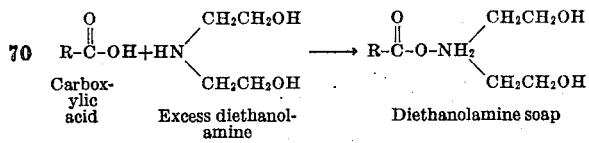

(b) An equilibrium occurs on heating this product at temperatures of from 120° C. to 250° C.

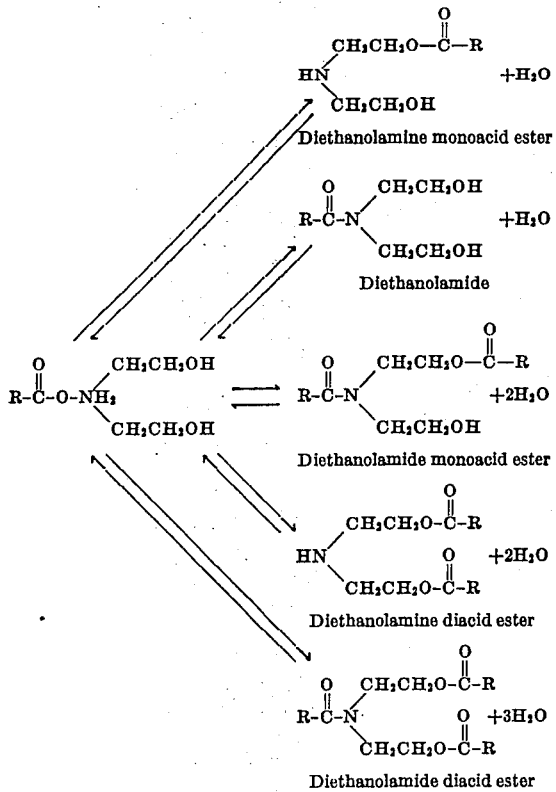

(c) The reaction mixture resulting from initial condensation of the reactants ages at a lower temperature and predominating quantities of compounds having the following general formulas apparently form

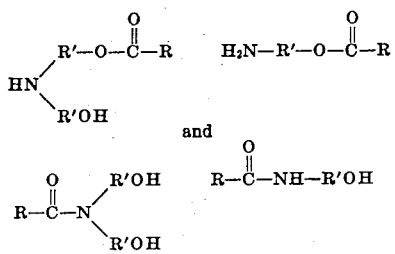

In the latter formulas R is a carbon containing nucleus preferably having no less than 7 nor more than 17 carbon atoms and is preferably an alkyl group either saturated or unsaturated such as those derived from fats and oil, but may be a substituted alkyl group, or an aromatic, hydroaromatic, heterocyclic or other carbon containing nucleus. The radical R' is a carbon containing radical linked on one hand to the nitrogen and on the other hand to an oxygen of a hydroxyl or ester group and is preferably an alkyl or a hydroxy alkyl group but may be a substituted alkyl group or other carbon containing radical.

When a mixture resulting from the condensation of alkylolamine and carboxylic acid is heated in the presence of free alkylolamine as in (c) above, a shift in equilibrium apparently occurs to form a substantial quantity of alkylolamine derivatives having a single acylatable hydrogen atom replaced by a carboxylic group. These compounds predominate in the reaction mixture when they exceed in quantity the di- and tri-substituted alkylolamine derivatives. The reaction between lauric acid and diethanolamine produces initially predominating quantities of O-lauroyl-N-lauroyl diethanolamine and (bis-β-O-lauroylethoxy)-N-lauramide. These substances are undesirable. Their formation may be suppressed by heating or aging, at a lower temperature, to promote the formation of active compounds such as N-β-dihydroxy-ethyllauramide. The overall chemical reaction during the secondary heating or aging period is probably as follows in the case of the condensation product of diethanolamine and lauric acid:

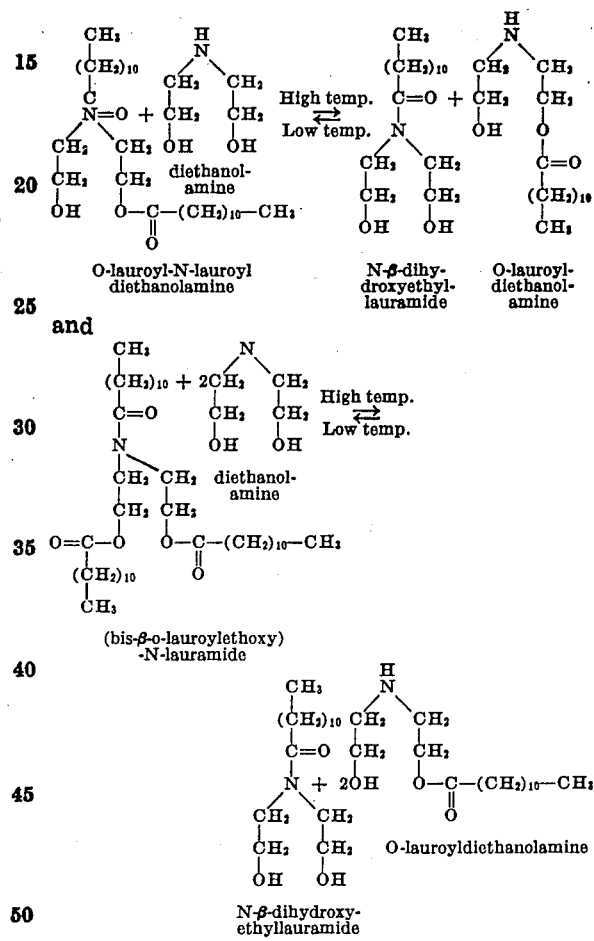

It is noted that during the secondary heating period at relatively low temperatures, the di- and tri-substituted derivatives of diethanolamine react with free diethanolamine to form the monosubstituted derivatives.

A somewhat similar mixture of reaction products results from the reaction of alkylolamines with triglyceride fats with the exception that soap does not form and the mixture includes free glycerine, which does not materially affect the aging process.

Inasmuch as the activity of the present agents for various applications depends to a large extent on the balance between hydrophilic and lipophilic activity, the process of this invention stabilizes this balance by reducing the multi-acylated derivatives in which hydrophilic activity has been depreciated by the acylation of hydroxyl groups in the alkylolamine.

The following examples illustrate the method of manufacturing the improved reaction products of the present invention:

*Example 1.*—One mol of molten lauric acid (200 g.) is mixed with 3 mols (315 g.) of diethanolamine with constant stirring. The heat of neutralization is sufficient to keep the diethanolamine laurate soap a liquid. Heat is then applied and the temperature raised from 150° C. to 170° C. A short air condenser permits the water produced to escape but retains any volatilized diethanolamine. Heating is continued under vacuum until approximately 1 mol of water is liberated in the reaction for every mol of acid employed, at which point the soap content has fallen to about 2 per cent or less. This usually requires about 4 hours. Sufficient melted lauric acid is then added with stirring after the temperature has dropped to 70° C. to raise the soap content to 10 per cent. The temperature is then lowered to about 60° C. and the heating continued for a period of about 24 hours.

*Example 2.*—One mol (200 g.) of molten lauric acid is mixed with three mols (315 g.) of diethanolamine. The heat of neutralization is sufficient to maintain the diethanolamine laurate soap a liquid. The material is then heated at 140° C. under a reduced pressure of about 25 to 50 mm. of mercury, until roughly one mol of water is liberated for each mol of acid employed and a soap content of about 2 per cent is reached. This will take ordinarily about 4 hours. After the temperature has dropped to 70° C. sufficient molten lauric acid is added to bring the soap concentration up to 10 per cent and the heating continued at 60° C. for a period of 48 hours. A soap of medium hardness is prepared by incorporating 8 parts of the reaction product into 92 parts of a melted soap of medium hardness. The product is well homogenized, cooled and molded.

*Example 3.*—One mol of coconut oil fatty acids (209 g.) is mixed with 3 mols (315 g.) of diethanolamine. The melted soap and excess amine is then heated at 150° C. to 160° C. under reduced pressure (50 mm. of mercury) for 4 hours. At the end of this time, approximately one mol of water has been removed for each mol of acid employed and the mixture is cooled to 70° C. Sufficient coconut oil fatty acids are thereupon added to raise the soap content to 10 per cent and the product is then aged for 36 hours at 60° C.

*Example 4.*—One mol of molten lauric acid (200 g.) is mixed with 3 mols (225 g.) of propanolamine. The heat of neutralization is sufficient to maintain the mixture in liquid state. The mixture is then heated at about 160° C. under reduced pressure until roughly 1 mol of water is liberated for each mol of the acid employed and a soap content of about 1 per cent is obtained. This will take about 5 hours. Additional lauric acid was added to adjust the soap content to about 10 per cent, the temperature lowered and the heating continued at 80° C. for a period of 60 hours.

*Example 5.*—Diethanolamine (1447 g.) was reacted with a mixture of cottonseed oil (2800 g.) that had been hydrogenated to iodine number of 6.6 and cottonseed oil (615 g.) which had been hydrogenated to iodine number of 37.4, for a period of about 2½ hours at a temperature of 150° C. and a partial vacuum of from 30 to 50 mm. pressure. The resulting product was steam-deodorized at 5 mm. pressure and at a temperature of 155° C. for 15 minutes and the product cooled to 60° C. under a vacuum and then aged at 60° C. under atmospheric pressure for 96 hours. In the aging process, the amine content considerably decreased as determined by titration, indicating the conversion of free amino groups to the neutral amide. The resulting product was employed in the manufacture of shortening.

The reaction products of the present invention are particularly applicable for addition to detergents such as soaps and cleansers for inhibiting soap precipitation in the presence of the polyvalent metal ions which exist in hard water. It has been found that when a small proportion of the reaction products is incorporated into a soap, that insoluble soap precipitation is completely inhibited. Furthermore, the present reagents may be employed in the manufacture of shortenings for improving the creaming properties and permitting a substantial increase in the proportion of sugar without affecting the rising properties of the product.

While we have disclosed the preferred embodiments of our invention, it is understood that the details thereof may be varied within the scope of the following claims.

We claim:

1. The process for the preparation of reaction products of primary and secondary alkylolamines, which comprises reacting an excess of the alkylolamine with a higher fatty acid acylating substance at a temperature between 100° C. and 250° C. for a period of from about 15 minutes to approximately 16 hours, and then aging the resulting mixture by maintaining at a temperature between about 40° C. and 90° C. for a period of from about 4 to 100 hours; whereby said aging causes a shift in the reaction mixture equilibrium from the multiacylated derivatives to the monoacylated derivatives.

2. The process for the preparation of reaction products of primary and secondary alkylolamines, which comprises reacting an excess of the alkylolamine with a higher fatty acid acylating substance at a temperature between 100° C. and 250° C. for a period of from about 15 minutes to approximately 16 hours, cooling the product of the foregoing reaction below 100° C. and adding a quantity of higher fatty acid in an amount sufficient to produce between approximately 3 to 15 percent soap by weight in the reaction product, and then aging the resulting mixture by maintaining at a temperature between approximately 40° C. and 90° C. for a period of from about 4 to 100 hours; whereby said aging causes a shift in the reaction mixture equilibrium from the multiacylated derivatives to the monoacylated derivatives.

3. The process for the preparation of reaction products of primary and secondary alkylolamines, which comprises reacting an excess of the alkylolamine with a higher fatty acid acylating substance at a temperature between approximately 140° C. and 170° C. for a period of from about 2 to 4 hours, and then aging the resulting mixture by maintaining at a temperature between about 50° C. and 80° C. for a period of from 10 to 48 hours.

4. The process for the preparation of the reaction products of primary and secondary alkylolamines and carboxylic acids, which comprises reacting an excess of the alkylolamine with a fatty acid having from 8 to 18 carbon atoms to the molecule at a temperature of from about 100° C. to 250° C. for a period of from about 15 minutes to 16 hours, and then aging the resulting product by maintaining the said product at a temperature of from about 50° C. to 80° C. for a period of from 10 to 48 hours.

5. The process for the preparation of reaction products of primary and secondary alkylolamines and carboxylic acids, which comprises reacting an excess of the alkylolamine with a fatty acid having from 8 to 14 carbon atoms to the molecule at a temperature of from about 140° C. to 160° C. for a period of from about 2 to 4 hours, and then aging the resulting product at a temperature of from about 50° C. to 80° C. for a period of from about 10 to 48 hours.

6. The process for the preparation of the reaction products of primary and secondary alkylolamines and carboxylic acids, which comprises reacting an excess of the alkylolamine with a fatty acid having from 8 to 18 carbon atoms to the molecule at a temperature of from about 140° C. to 170° C. for a period of from about 2 to 4 hours, cooling the reaction product below 100° C. and adding a quantity of higher fatty acid in an amount sufficient to produce between approximately 3 to 15 percent soap by weight in the reaction product, and then aging the resulting mixture by maintaining at a temperature between approximately 50° C. and 80° C. for a period of from 10 to 48 hours.

7. The process for the preparation of reaction products of secondary alkylolamines and carboxylic acids, which comprises reacting an excess of diethanolamine with a fatty acid having from 8 to 18 carbon atoms at a temperature of from about 140° C. to 170° C. for a period of from about 2 to 4 hours, and then aging the resulting product by maintaining at a temperature of from about 50° C. to 80° C. for a period of from 10 to 48 hours.

8. The process for the preparation of reaction products of secondary alkylolamines and carboxylic acids, which comprises reacting an excess of diethanolamine with a higher fatty acid at a temperature of about 140° C. to 170° C. for approximately 2 to 4 hours, cooling the mixture to below 100° C. and adding a quantity of higher fatty acid sufficient to produce between approximately 3 to 15 percent soap by weight in the reaction products, and then aging the resulting mixture by maintaining at a temperature of approximately 50° C. to 80° C. for approximately 10 to 48 hours.

9. The process for the preparation of reaction products of primary and secondary alkylolamines, which comprises reacting an excess of the alkylolamine with a glyceridic ester of a fatty acid, said acid having from 8 to 18 carbon atoms, at a temperature of from about 100° C. to 250° C. for a period of from about 15 minutes to 16 hours, and then aging the resulting product by maintaining at a temperature of from about 40° C. to 90° C. for a period of from about 4 to 100 hours.

10. The process for the preparation of reaction products of primary and secondary alkylolamines, which comprises reacting an excess of the alkylolamine with a glyceridic ester of a fatty acid, said acid having from 8 to 18 carbon atoms, at a temperature of from about 140° C. to 170° C. for a period of from about 2 to 4 hours, and then aging the resulting product by maintaining at a temperature of from about 50° C. to 80° C. for a period of from about 10 to 48 hours.

11. The process for the preparation of reaction products of primary and secondary alkylolamines, which comprises reacting an excess of diethanolamine with a glyceridic ester of a fatty acid, said acid having from 8 to 18 carbon atoms, at a temperature of from about 140° C. to 170° C. for approximately 2 to 4 hours, cooling the mixture below 100° C. and adding a quantity of higher fatty acid sufficient to produce between approximately 3 to 15 percent soap by weight in the reaction products, and then aging the resulting mixture by maintaining at a temperature of approximately 50° C. to 80° C. for approximately 10 to 48 hours.

12. The process for the preparation of reaction products of secondary alkylolamines, which comprises reacting an excess of diethanolamine with a glyceridic ester of a fatty acid, said acid having from 8 to 18 carbon atoms, at a temperature of from about 140° C. to 170° C. for a period of from about 2 to 4 hours, and then aging the resulting product by maintaining at a temperature of from about 50° C. to 80° C. for a period of from about 10 to 48 hours.

13. The process for the preparation of reaction products of secondary alkylolamines, which comprises reacting an excess of diethanolamine with a glyceridic ester of a fatty acid, said acid having from 8 to 18 carbon atoms at a temperature of about 140° C. to 170° C. for approximately 2 to 4 hours, cooling the mixture to below 100° C. and adding a quantity of higher fatty acid sufficient to produce between approximately 3 to 15 percent soap by weight in the reaction products, and then aging the resulting mixture by maintaining at a temperature of approximately 50° C. to 80° C. for approximately 10 to 48 hours.

14. The process for the preparation of reaction products of primary and secondary alkylolamines and higher fatty acids, which comprises reacting an excess of an alkylolamine with a fatty acid having from 8 to 14 carbon atoms to the molecule at a temperature of from about 140° C. to 160° C. for a period of from 2 to 4 hours and aging the resulting product at a temperature of from about 50° C. to 80° C. for a period of from 24 to 48 hours, whereby products relatively rich in alkylolamine derivatives containing only one replaceable hydrogen substituted by an acyl group are obtained.

HARLAND H. YOUNG.
DAVID RUBINSTEIN.

REFERENCES CITED

The following references are of record in the file of this patent:

UNITED STATES PATENTS

| Number | Name | Date |
|---|---|---|
| 2,089,212 | Kritchevsky | Aug. 10, 1937 |
| 2,094,609 | Kritchevsky | Oct. 5, 1937 |
| 2,022,678 | Kritchevsky | Dec. 3, 1935 |
| 2,002,613 | Orthner et al. | May 28, 1935 |
| 1,990,453 | Hund et al. | Feb. 5, 1935 |
| 2,076,217 | Albrecht | Apr. 6, 1937 |
| 2,280,830 | Johnson | Apr. 28, 1942 |